R. C. PIERCE.
WORK TABLE FOR ELECTRIC WELDING MACHINES.
APPLICATION FILED DEC. 13, 1912.
1,078,639.
Patented Nov. 18, 1913.
2 SHEETS—SHEET 2.
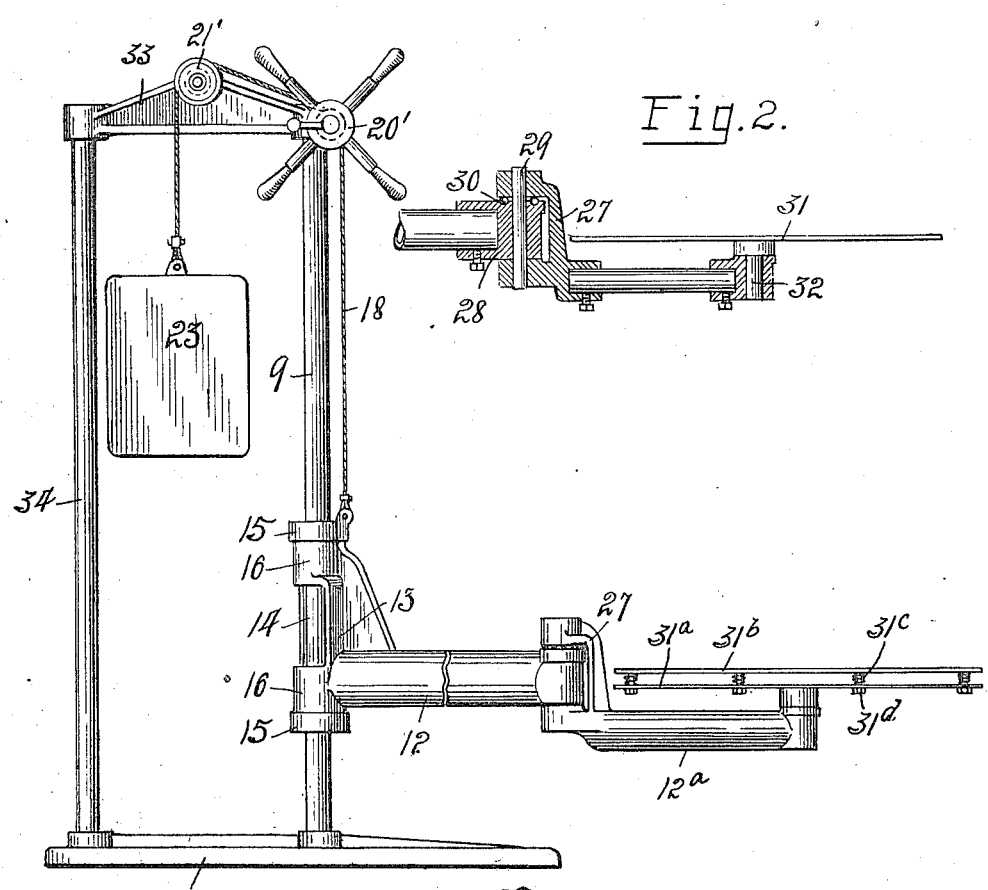
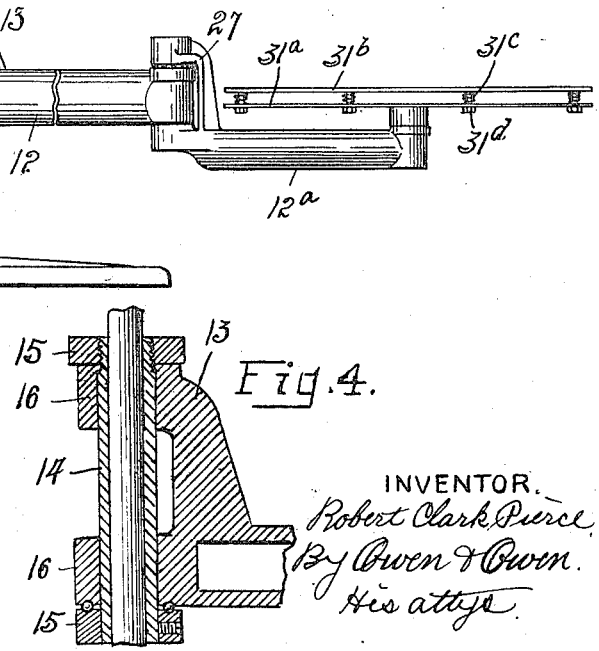

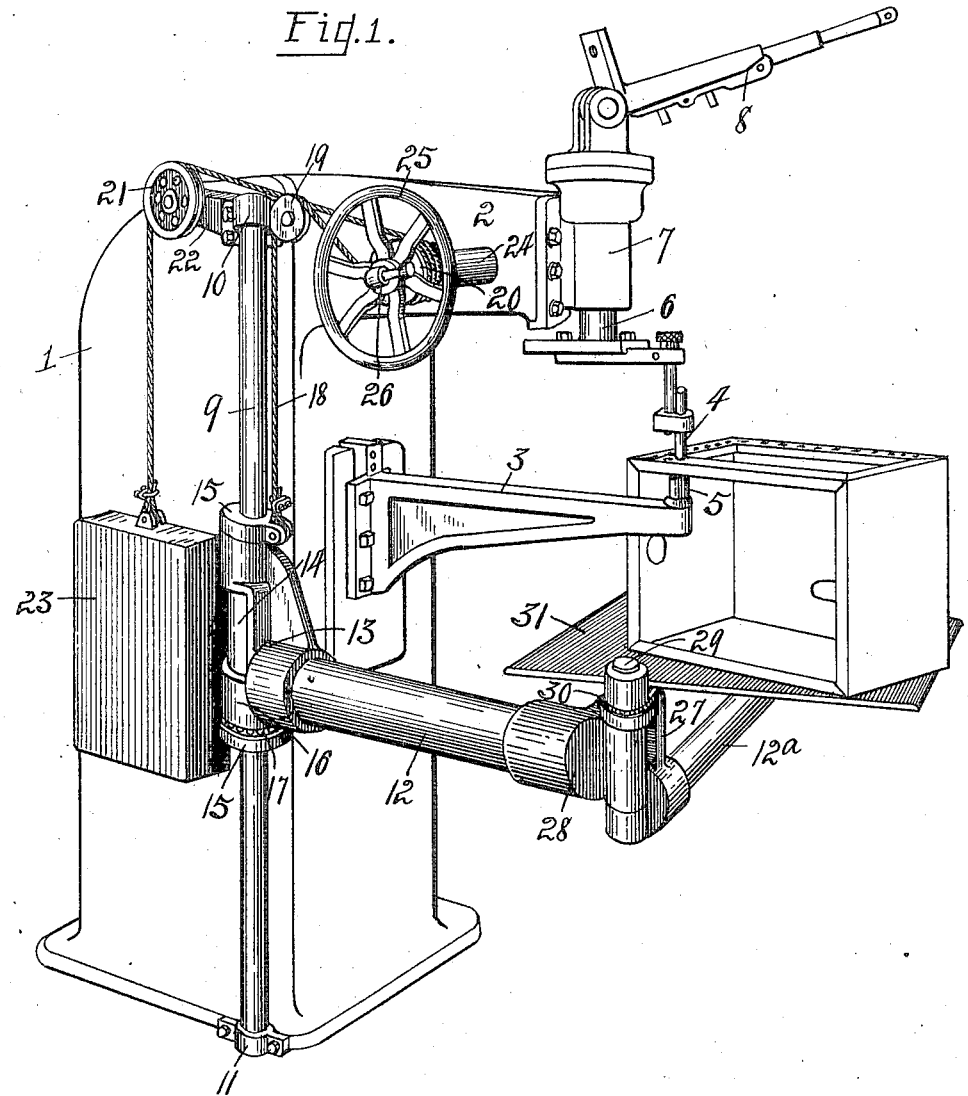

UNITED STATES PATENT OFFICE.

ROBERT CLARK PIERCE, OF CINCINNATI, OHIO, ASSIGNOR TO THE TOLEDO ELECTRIC WELDER COMPANY, OF CINCINNATI, OHIO, A CORPORATION OF OHIO.

WORK-TABLE FOR ELECTRIC WELDING-MACHINES.

1,078,639.  Specification of Letters Patent.  Patented Nov. 18, 1913.

Application filed December 13, 1912. Serial No. 736,630.

*To all whom it may concern:*

Be it known that I, ROBERT CLARK PIERCE, a citizen of the United States, and a resident of Cincinnati, in the county of Hamilton and State of Ohio, have invented a certain new and useful Work-Table for Electric Welding-Machines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to work supporting means, particularly intended and constructed for use in connection with electric welding machines.

The object of my invention is the provision, particularly in combination with an electric welding machine or for use in connection therewith, of simple and efficient mechanism for supporting work being welded, the work supporting part of which mechanism is capable of either or both vertical and universal horizontal adjustment to suit the size of the work and its movements relative to the welding dies during the welding operation, thus materially facilitating and lessening the work incident to the welding of heavy or bulky articles.

The invention is fully described in the following specification, and while in its broader aspect, it is capable of embodiment in numerous forms, a preferred embodiment thereof is illustrated in the accompanying drawings, in which,—

Figure 1 is a perspective view of an electric welding machine with a work supporting means embodying the invention attached to the frame thereof and supporting a box in welding position. Fig. 2 is a reduced sectional view of the outer end portion of the swinging work supporting arm. Fig. 3 is an elevation of the mechanism provided with a supporting frame to adapt it for use in connection with machines, the frames of which are not capable of having the work supporting mechanism conveniently attached thereto, and Fig. 4 is an enlarged section of the swinging arm head mounted on its guide-bar.

Referring to the drawings, 1 designates the frame of an electric welding machine having the customary horns 2 and 3 projecting horizontally therefrom in vertically spaced relation with the upper horn 2, in the present instance, carrying the movable welding-die 4 and the lower horn 3 carrying the fixed welding-die 5. The movable die 4 is carried by a plunger 6, which is mounted for vertical reciprocatory movements in the head 7 of the horn 2 and has its movements controlled by a lever 8.

A vertical guide-bar 9 is attached at its upper and lower ends by brackets 10 and 11, respectively, or in any other suitable manner, to a side of the machine frame 1, if said frame is of suitable size and construction for such purpose. An arm 12 projects laterally from the guide-bar 9 and is provided at its inner end with a head 13, which is carried by said bar 9 for both horizontal swinging and vertical reciprocatory movements thereon. While the head 13 may be of any suitable construction, it is shown, in the present instance, as comprising a slide-sleeve 14, which is mounted directly on the guide-bar 9 and provided at its upper and lower ends with collars or shoulders 15, one at least of which is removable from the sleeve, and mounted on the sleeve between said collars for swivel movements relative thereto is a yoke 16, which forms a part of the head and has an arm 12 fixedly projecting therefrom. It is preferable to provide a ball-bearing between the lower collar 15 and the adjacent end of the yoke 16, as shown at 17, to facilitate an easy swinging of the yoke and arm relative to said sleeve.

The vertical adjustment of the sleeve 15 and associated parts on the guide-bar 9 are controlled by a cable or other flexible draft member 18, which attaches at one end to the upper collar 15 of the sleeve and extends upwardly therefrom over a guide-sheave 19, which is carried by or adjacent to the bracket 10. The cable thence passes one or more times around a control drum 20, from whence it extends over a sheave 21 that is carried, in the present instance, by an arm 22 projecting from the bracket 10, and then extends downward and has a counterweight 23 attached to its free end. The drum 20 is mounted on a shaft 24 projecting from the horn 2 of the machine frame, and is provided at its outer end with a hand control-wheel 25. It will be apparent that a turning of the hand-wheel 25 will effect a raising or lowering of the arm 12 and its head, as the case may be, and that such head may be secured in properly adjusted position by a tightening of a friction locking member 26 against the outer end of the wheel hub, or in any other suitable manner, as is well understood in the art.

The arm 12 is preferably provided at its outer end with a horizontal swinging section $12^a$, which is swiveled to the outer end of the arm 12, as by means of a yoke 27, which has its arms embracing the top and lower sides of the outer end casting or part 28 of the arm 12 and attached to the opposite ends of a vertical shaft 29 projecting through the part 28. Ball-bearings 30 are shown as disposed between the upper arm of the yoke 27 and the coacting end portion of the part 28 to facilitate free relative swinging movements of the arm sections 12 and $12^a$.

A table 31 is carried for free horizontal turning movements by the outer end of the arm section $12^a$, and for such purpose has a stub shaft 32 projecting downward from its center and journaled in a registering bearing in the outer end of said section. The table 31 may be composed of two parts $31^a$ and $31^b$, the upper one of which is yieldingly spaced from the lower one by coiled compression springs $31^c$, which encircle connecting bolts or screws $31^d$, as shown in Fig. 3.

Should the machine frame not be of suitable form for the attaching of the guide bar 9 thereto, as shown in Fig. 1, such bar may be carried by a supplemental frame part having the base-member 32, the top-member 33 and the upright 34, which upright rigidly connects the two members 32 and 33. These members are also rigidly connected by the guide-bar 9, which forms one of the uprights of the frame.

The control drum for the arm suspending cable, which drum, in the present instance, is designated 20', has its shaft projecting from the front end portion of the top member 33, while the cable guiding sheave, that is disposed intermediate the control drum and the cable weight, is designated 21' and is carried by a pintle or shaft projecting from the top member 33. In other respects the mechanism is the same in its construction and operation as previously described. This supplemental frame may be placed at one side of or at any convenient position relative to a welding machine or other machine with which it is to be associated, and the arm 12, $12^a$ and work-table carried thereby can then be adjusted in the same manner with relation to the welding dies as if the guide bar 9 was attached directly to the machine frame.

A work supporting means of this character is intended more particularly for use in connection with the welding of bulky or heavy work, as the work may be placed upon the table 31 at the end of the arm and then turned or moved in any direction relative to the welding dies as the performance of the successive welding operation may require. To adjust the vertical position of the table relative to the dies to suit the work being acted on, it is only necessary for the operator to turn the control-wheel 25 to effect the desired adjustment, the parts being then locked in adjusted position by a tightening of the locking member 26 against the control wheel. This work supporting means, in addition to serving to support a piece of work in proper position relative to the welding dies during a welding operation, may also be turned to place the table at one side of the machine to enable work pieces to be piled thereon either before or after being welded, as may be desired.

I wish it understood that my invention is not limited to any specific construction, form or arrangement of the parts except in so far as such limitations are specified in the claim.

Having thus described my invention, what I claim as new, and desire to secure by Letters Patent, is,—

In an adjustable work table, a bearing comprising a bearing sleeve, collars secured to the ends on the said sleeve, a supporting rod located within the said sleeve, and means connected to one of the said collars for moving the said sleeve with respect to the said supporting rod, the other of the said collars having a ball-bearing, a bracket bearing located between the said collars and having an adjustable arm, a table supported by the said arm.

In testimony whereof, I have hereunto signed my name to this specification in the presence of two subscribing witnesses.

ROBERT CLARK PIERCE.

Witnesses:
 NIEL MACNEALE,
 ALBERT WILLIAMSON.

---

Copies of this patent may be obtained for five cents each, by addressing the "Commissioner of Patents, Washington, D. C."